(12) United States Patent
Tate et al.

(10) Patent No.: US 7,342,969 B2
(45) Date of Patent: Mar. 11, 2008

(54) SIGNALING WITH MULTIPLE CLOCKS

(75) Inventors: Larry R. Tate, Hopkinton, MA (US); Timothy D. Wig, Northborough, MA (US)

(73) Assignee: Intel Corporation, Santa Clara, CA (US)

( * ) Notice: Subject to any disclaimer, the term of this patent is extended or adjusted under 35 U.S.C. 154(b) by 791 days.

(21) Appl. No.: 10/629,325

(22) Filed: Jul. 28, 2003

(65) Prior Publication Data
US 2005/0025252 A1    Feb. 3, 2005

(51) Int. Cl.
*H04B 3/00* (2006.01)
*H04L 7/02* (2006.01)

(52) U.S. Cl. .................... 375/257; 375/360
(58) Field of Classification Search ........... 375/259, 375/371, 226, 327, 219, 222, 377, 257, 360; 327/141; 370/516, 517, 518, 519; 714/700
See application file for complete search history.

(56) References Cited

U.S. PATENT DOCUMENTS

| | | | |
|---|---|---|---|
| 4,785,394 A | 11/1988 | Fischer | |
| 5,910,742 A * | 6/1999 | Synder et al. | 327/165 |
| 6,278,755 B1 * | 8/2001 | Baba et al. | 375/360 |
| 6,463,092 B1 | 10/2002 | Kim et al. | |
| 2003/0043926 A1 * | 3/2003 | Terashima et al. | 375/257 |
| 2003/0061564 A1 * | 3/2003 | Maddux | 714/798 |
| 2004/0071247 A1 * | 4/2004 | Dunning et al. | 375/355 |

FOREIGN PATENT DOCUMENTS

| | | |
|---|---|---|
| EP | 0 596 694 | 5/1994 |
| EP | 05696694 | 11/1994 |

OTHER PUBLICATIONS

Nogami, Kazutaka, et al. "Phase Modulation I/O Interface Circuit", IEEE International Solid-State Circuits Conference, New York, USA, vol. 37, pp. 108-109, 318, Feb. (1994).
PCT/US2004/021809 Int'l Preliminary Report on Patentability (Chapter 1) dated Feb. 9, 2006.

\* cited by examiner

*Primary Examiner*—Don N. Vo
(74) *Attorney, Agent, or Firm*—Philip A. Pedigo

(57) ABSTRACT

At least two sequences of predetermined reference times are established on respective ones of at least two communication lines. At least some of the reference times of at least one of the sequences occur out-of-phase with at least some of the reference times of another of the sequences. Digital data is encoded onto data signals on one or more communication lines such that a time difference between at least one of the data signals and the nearest one of the reference times on one of the communication lines is smaller than the time difference between the same data signal and the nearest one of the reference times on another one of the communication lines.

33 Claims, 16 Drawing Sheets

SIGNALING WITH MULTIPLE CLOCKS

TECHNICAL FIELD

This description relates to signaling with multiple clocks.

BACKGROUND

Signaling between active devices or integrated circuits (IC's) mounted on computer circuit boards typically relies upon a combination of packages, sockets, connectors, cables, and printed circuit board features to implement a physical interconnection. Referring to FIG. 1, this chip-to-chip communication is often implemented as a number of parallel data interconnects that comprise a bus 22. In some signaling schemes, digital data is represented as the timing of pulses carried on each interconnect with reference to one or more clock signals that are carried on a clock line 24 provided by a common source 26. Forwarded clock signals are typically routed in a manner similar to that of the data signals they accompany. The signals between the input/output (I/O) transceivers 28 and 30 must traverse channel segments both on the IC's 32 and between them 34 that have impairments and are, for practical low cost channel components, less capable of supporting the required data transmission rates than are the transceiver circuits themselves. These impairments include dispersion, crosstalk, loss, reflections due to mismatch, lowpass filtering effects of the channel and other factors that together impose an upper limit on the throughput of the physical link (boards, packages and circuit) at a given maximum Bit Error Rate (BER). Further, the interaction between residual signal components generated by previous symbols can contribute to inter-symbol interference (ISI), which may further limit channel throughput. These impairments to the capacity of the physical channel can be mitigated somewhat by use of higher performance components and circuit board materials, which incur greater cost. Adding additional data lines to a bus will also add cost in terms of both power and board routing space.

Various forms of modulation can be used in place of conventional binary signaling to yield an advantage in data throughput by making greater use of the available channel bandwidth. Practical digital wide-band modulation includes pulse width modulation (PWM), phase modulation (PM), amplitude modulation (AM), and risetime modulation. Many other techniques for improving a channel's binary throughput performance exist including such strategies as transmit and/or receive side equalization and echo cancellation. Return-to-reference or non-return-to-reference differential signaling is commonly used. Many of these signaling schemes may be layered to form phase and amplitude modulation together, for example.

Active elements capable of generating and resolving signal transitions to within narrow time increments can be used in transmitters and receivers in order to implement PM, PWM, and similar modulation schemes in which the locations of signal transitions are varied in time with respect to an embedded or parallel time reference. As illustrated in FIG. 2, digital data may be encoded in terms of a time difference 40 between a signal transition 42 and the precisely known time of occurrence of a transition 44 of a reference clock. For the sake of the discussion, a transition will be assumed to be either a change in level, such as is used in level-based NRZ signaling; or a pulse, such as that used in RZ signaling.

One of the limits on the throughput of the physical link is timing resolution, that is, the precision with which the time difference 40 can be determined. A system that relies on discrimination of the phase of a transition with respect to the phase of a reference transition to achieve time resolution will accumulate temporal measurement variations throughout the duration of the interval 40 separating the signal transition from its timing reference transition. This phenomenon is described as jitter integration. Sources of jitter may include power supply variations or simultaneous switching of other active circuit elements, for example. If the integrated jitter is too high, ambiguity or errors in the classification of the arrival time of a transition may result. It is expected that the jitter will vary over time, being both additive and subtractive, with the greatest potential jitter integration occurring over long timing intervals. One must consider the possibility that all jitter contributions will be additive when setting the worst-case jitter margin.

Simply stated, two time references will accumulate jitter with respect to one another as they pass through dissimilar physical segments, typically active elements, in a circuit. Signals that emanate from a common source are considered to be identical, and initially have zero jitter with respect to one another. It is an accepted practice to assume that signals that pass through similar adjacent circuit elements that share the same power supply will jitter together with high correlation and with little net difference in their relative phase. The jitter statistics of a signal will be preserved as it transits passive elements comprising similar physical channels, and may increase further due to other sources such as electromagnetic interference (EMI), and crosstalk.

In a system using a data bus, jitter integration increases as the time difference 40 separating the transitions of a data line and adjacent reference clock transitions increase. Reducing a data channel's time difference 40 reduces the error in phase measurement caused by jitter accumulation. In some systems, the reference clock signal is generated at a rate that is sufficiently high that the inaccuracy in measured delay is minimized. The clock transitions 44 may also be aligned with data line transitions 42 to further reduce relative timing errors. The clock reference is then forwarded with the data signals in the bus using matched circuit and board structures. Since the physical channel frequently serves to limit the frequency spectrum content of transmitted signals, a limit is often reached in the rate that this clock can be run. Another limiting factor on the clock is electromagnetic EMI emissions, which often increase with frequency and must meet regulatory and system requirements related to EMI pickup of other system components.

In a phase-modulated system, the modulator and demodulator circuits can use the nearest reference clock transition as a timing reference, thereby minimizing the time-distance from the reference and resulting jitter integration. For an ideal (maximum number of possible symbols) phase modulation scheme, data line transitions are permitted over a continuous range of phase positions, with respect to the reference clock. This allows an arbitrarily large symbol set that could provide infinite data throughput. The practical barrier to achieving this throughput is the limited precision that is possible in localizing a transition's discrete location in time, largely due to circuit and ISI jitters. Using a single clock reference with a phase modulation scheme having several phase slots means that the time distance of transitions of the data line to those of the clock will vary, depending on which modulation state was generated. A designer typically assumes a conservative, worst-case jitter margin that ensures that jitter does not lead to mis-classification (bit error) of the phase of an incoming data signal.

DETAILED DESCRIPTION

Figure 1:
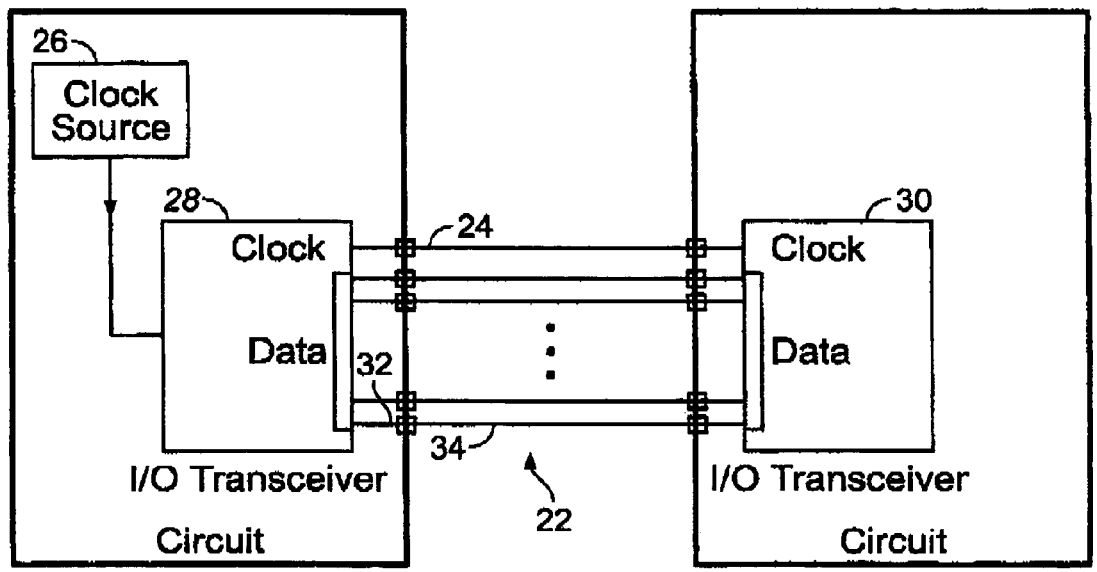
FIG. 1 is a block diagram of circuits connected by a communication bus.
Figure 2:
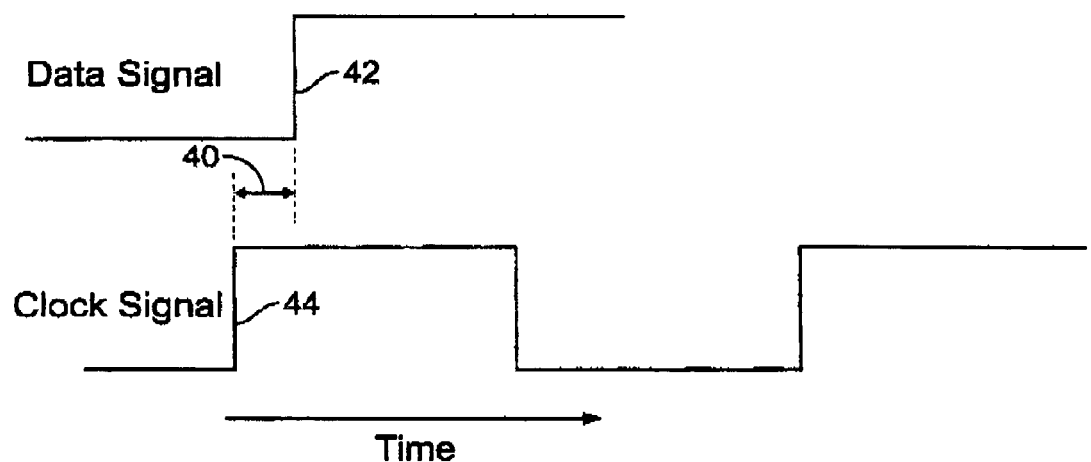
FIG. 2 shows a time difference between data and clock transitions.
Figure 3:
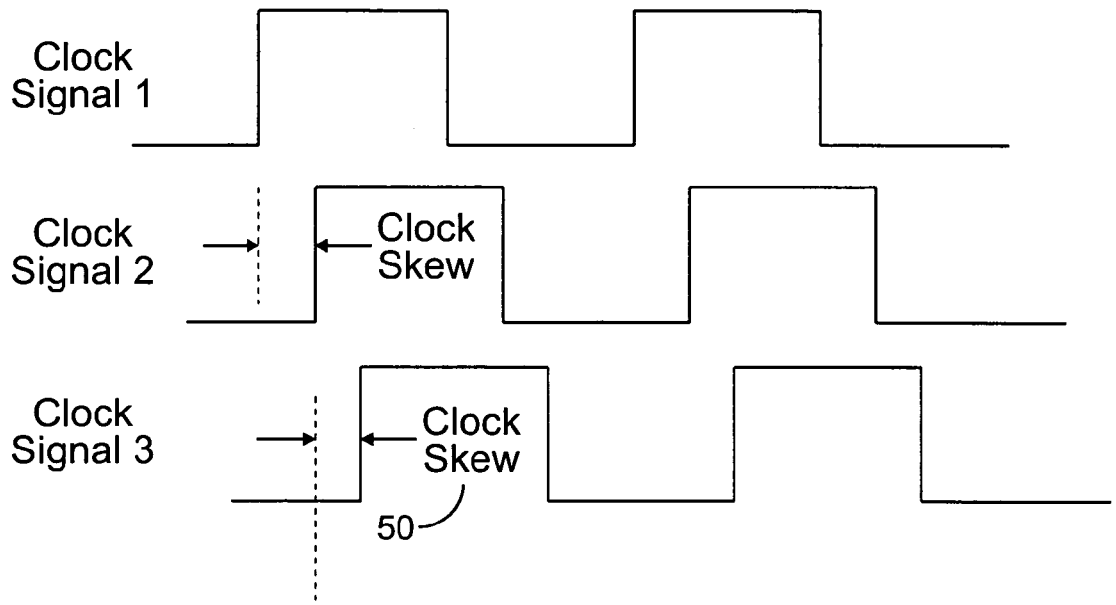
FIG. 3 is a timing diagram showing multiple clocks with a phase skew.

Multiple time reference signals (clocks) may be used to improve the timing resolution of, for example, phase and pulse-width modulated signals. The clock signals can be derived from the same source, but can have phases that are skewed with respect to one another by a pre-designed amount 50, as shown in FIG. 3. The modulator circuit can then reference the data transitions to the clock signal whose edge is closest to that transition. Since there are more clock transitions, the interval of time from a data signal transition to the nearest clock transition can be reduced. Jitter integration, which increases with the temporal distance between a data transition and its reference clock transition, will also be reduced resulting in an overall reduction in circuit jitter. This leads to a higher achievable bandwidth. In some implementations, the addition of more than one clock signal might require the sacrifice of an equivalent data line for carrying each additional clock signal, due to conductor routing constraints. However, the aggregate reduction in bus bandwidth caused by the loss of one (or more) data lines will be offset, under certain circumstances, by the overall increase in data rate per data line that is made possible by the improved jitter tracking bandwidth. For example, with ten data lines, the increase in bandwidth would only have to be on the order of 10% to just compensate for a single extra clock line. As the number of data lines increases the impact of sacrificing data lines in exchange for extra clock lines is even smaller, resulting in more modest increases in data rates to compensate.

There are several factors that would be considered in setting a balance between the number of clocks and number of data lines. The goal is to increase aggregate bus bandwidth achievable at a given maximum BER. The bandwidth in bits-per-second of a single data line carrying a digital signal is equal to the number of bits encoded in a symbol divided by the time length of that symbol (or symbol period). A digital signal is any signal onto which digital data (e.g., bit sequences) has been encoded using any one or combination of a variety of modulation techniques (e.g., PWM, PM, AM, PAM, QAM) that define a set of symbols. The bandwidth of a data line will increase with the number of bits that can be encoded per symbol, which depends not only on the circuit jitter, but also by the accuracy of the timing circuits. The additional on-die area consumed by the circuits required to exploit the additional timing sources may also limit the number of clock and data lines. For a complete optimization of the aggregate bandwidth one should also factor in such things as the quality of the channel, which can affect the BER and the minimum symbol period.

Figure 4:
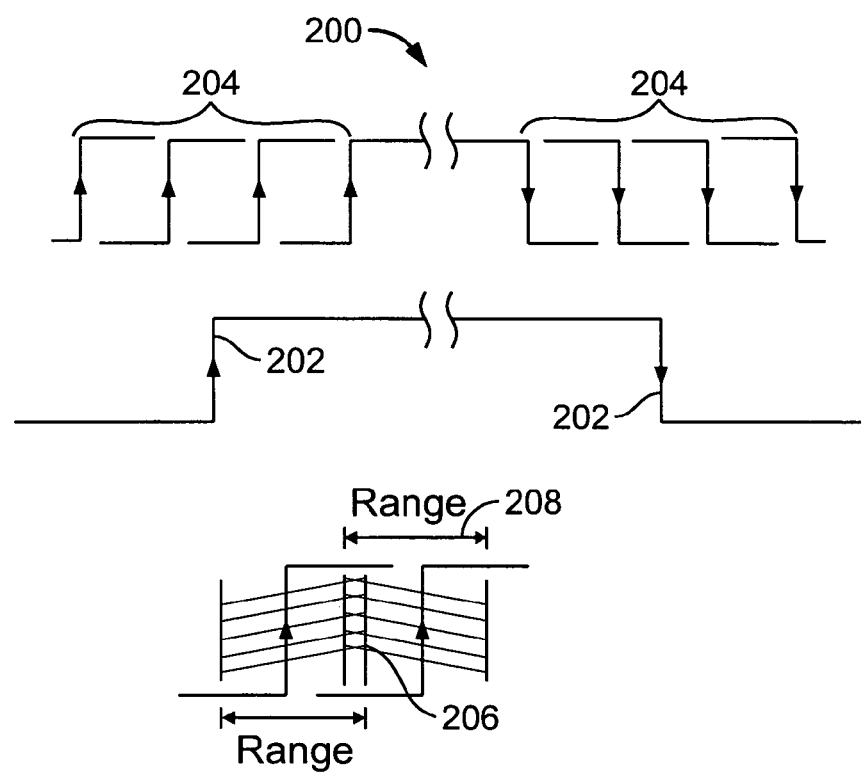
FIG. 4 is a schematic of a data symbol showing the slot range.

In some implementations a system may use digital data encoded on symbols 200 that have transitions occurring only at predetermined possible time delays from reference clock transitions 202, the time delays thus comprising a set of phase slots 204, as shown in FIG. 4. Consider n equally sized phase slots, and assume jitter integrations that increases linearly with the delay being measured. Then, for a given symbol period there is a limit to the resolution of phase (or time delay) that can be measured between transitions, and thus a limit to the number of resolvable phase slots that can be placed in the symbol period. If a transition is located n slots from its timing reference and is assumed to have jitter equal to n·slot_width·j, then its phase ranges from n·(1−j)·slot_width to n·(1+j)·slot_width purely as a result of clock jitter. ISI, crosstalk, device mismatch, channel variation, impedance mismatch are other factors that degrade design margins and limit overall link performance in real physical links. The timing budget allotted for these and other sources of timing variation is defined to be TBO (timing budget other than clock jitter). These sources of timing variation can be quantified by statistical distributions. For example, some may be modeled as truncated Gaussian distributions. The truncation can be chosen to support a target maximum BER, such as $10^{-16}$. Once truncated, the distributions may be added together to produce a worst-case result. Timing variation due to ISI may be modeled by a boundary function distribution that may be computed using peak distortion analysis.

Since the total range 208 for a phase slot increases as its distance from the nearest clock transition increases, at some distance adjacent phase slots will overlap 206. When this occurs it is no longer possible to resolve data transitions that may occur in those slots. The first slot position whose range overlaps that of the next adjacent slot occurs when $$(n-1)(1+j)+TBO = n(1-j)-TBO$$

which can be solved for $n_{max}$ the most distant resolvable slot $$n_{max} = \left\lfloor \frac{(1+j-2TBO)}{2j} \right\rfloor.$$

This indicates that if equally spaced slots are chosen, there is a limit on the number of discrete phase positions that may reference a particular clock transition, regardless of the slot size, for a given linear jitter.

Figure 5:
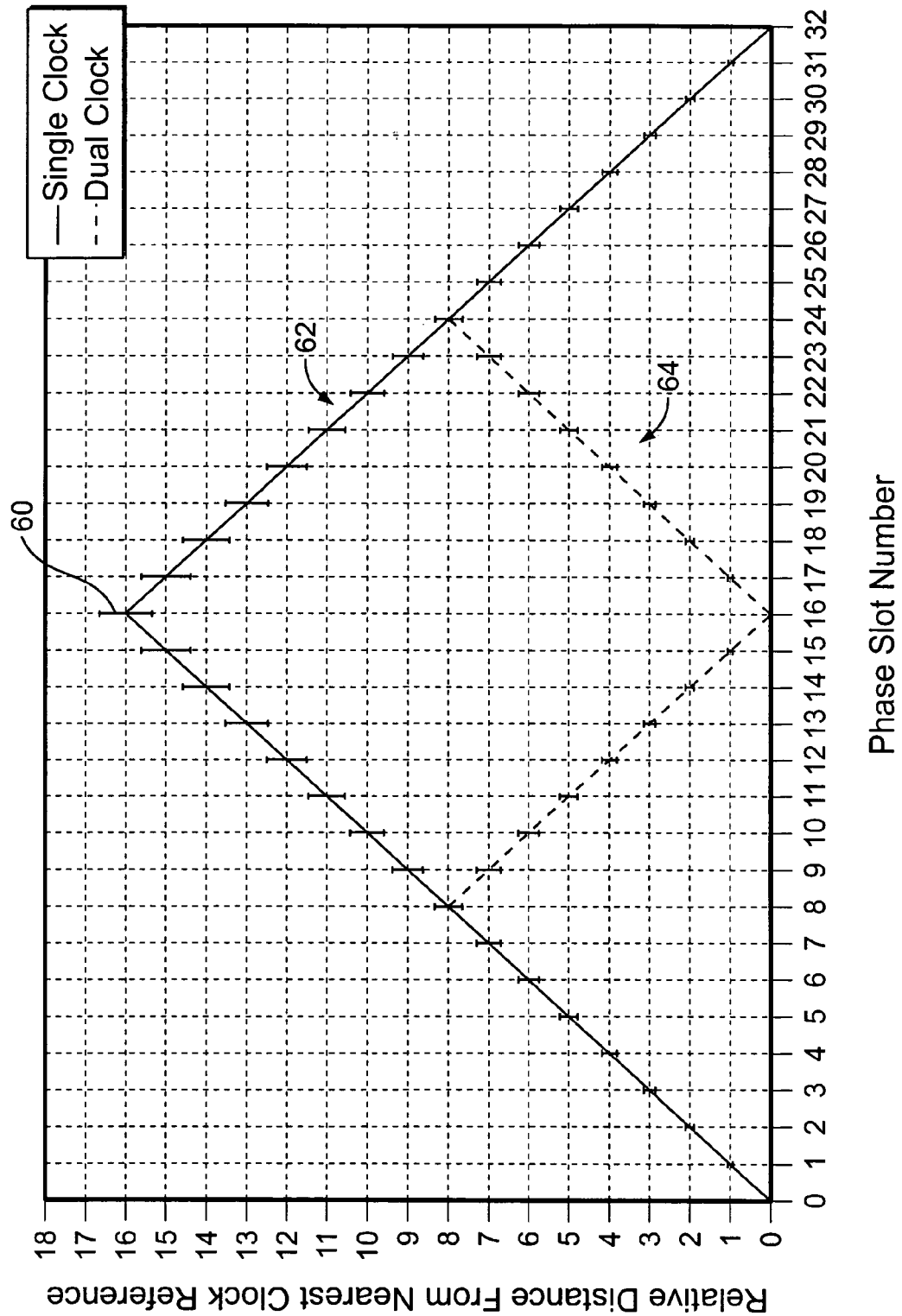
FIG. 5 is a plot of the timing uncertainty due to jitter.

FIG. 5 depicts the mounting effects of jitter on a system intended to have thirty-one equally spaced phase slots between adjacent clock transitions, shown in the upper trace 62. The phase slots are identified by phase slot number, PSN=1 to PSN=31. For this example, TBO is assumed to be zero, which is an unrealistic worst case for performance crossover for two clocks. Practical cases of TBO=0.25 or half the total budget have been observed in real systems which would result in a lower value for $n_{max}$. The error bars 60 represent the phase range or "timing window" for each phase position if jitter is integrated at a rate of 4% of the elapsed time (j=0.04).

These numbers yield a value of $n_{max}$=13 indicating that integrated jitter precisely aligns the edges of the timing windows associated with positions PSN=12 and PSN=13, and by symmetry, also at positions PSN=19 and PSN=20. The overlap of the timing windows would lead to ambiguity in classifying the incoming transitions for positions PSN=12 through PSN=20, rendering this modulation scheme unusable. The lower trace 64 demonstrates the benefit of adding a single additional clock transition that is centered within this frame at position PSN=16. When the dual clock scheme is used in this implementation, no misclassification is possible. The smallest margin between jitter boundaries occurs between PSN=7 and PSN=8 (and also between PSN=8 and PSN=9, PSN=23 and PSN=24, and PSN=24 and PSN=25) at 40% of the fundamental slot separation.

Figure 6:
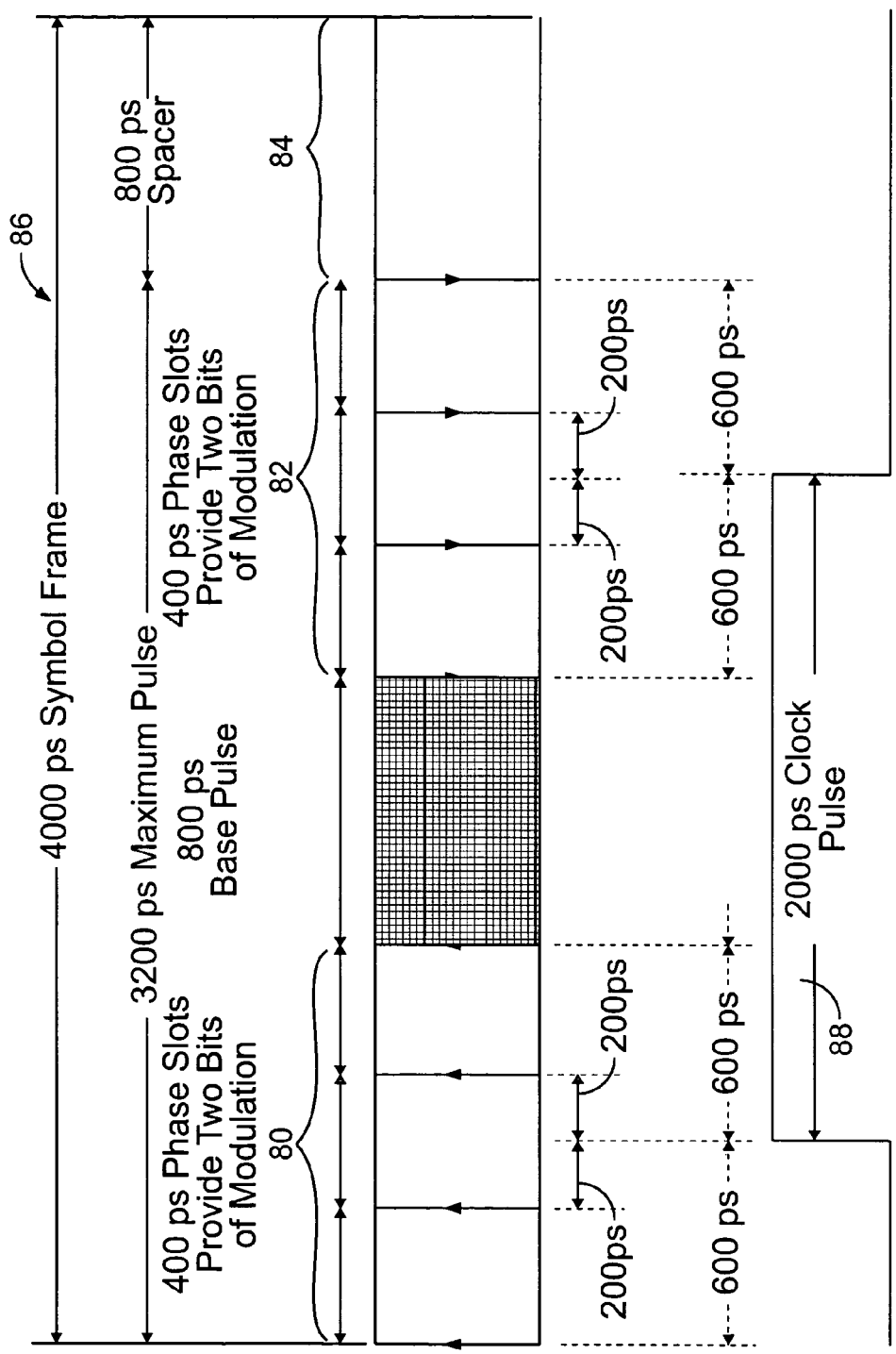
FIG. 6 shows a single clock phase modulation scheme.

Referring to FIG. 6, consider another implementation of a system that uses an 800 pico-second (ps) base pulse, modulated with four equally spaced 400 ps phase slots on both the rising 80 and falling 82 transitions. Assume that an 800 ps spacer 84 is required at the end of the symbol to minimize inter-symbol interference (ISI), thus forming a 4000 ps symbol frame 86. In this system, two transitions must occur in the symbol, one in any of the four leading slots 80 (encoding two bits of data) and another in the trailing group of four slots 82 (encoding another two bits of data). Each symbol provides four bits of data. FIG. 6 shows the time distances to the nearest reference transitions when there is only a single symmetric clock pulse 88 whose transitions are positioned to minimize jitter integration of the worst-case data transitions. It is assumed that the clock and data lines accumulate jitter at the same rate. It can be seen from FIG. 6 that the worst-case modulator jitter integration time is 600 ps, or 1½ unit intervals, which forces circuit designers to consume a larger share of their jitter budget to account for this. More jitter will be incurred during demodulation.

Figure 7:
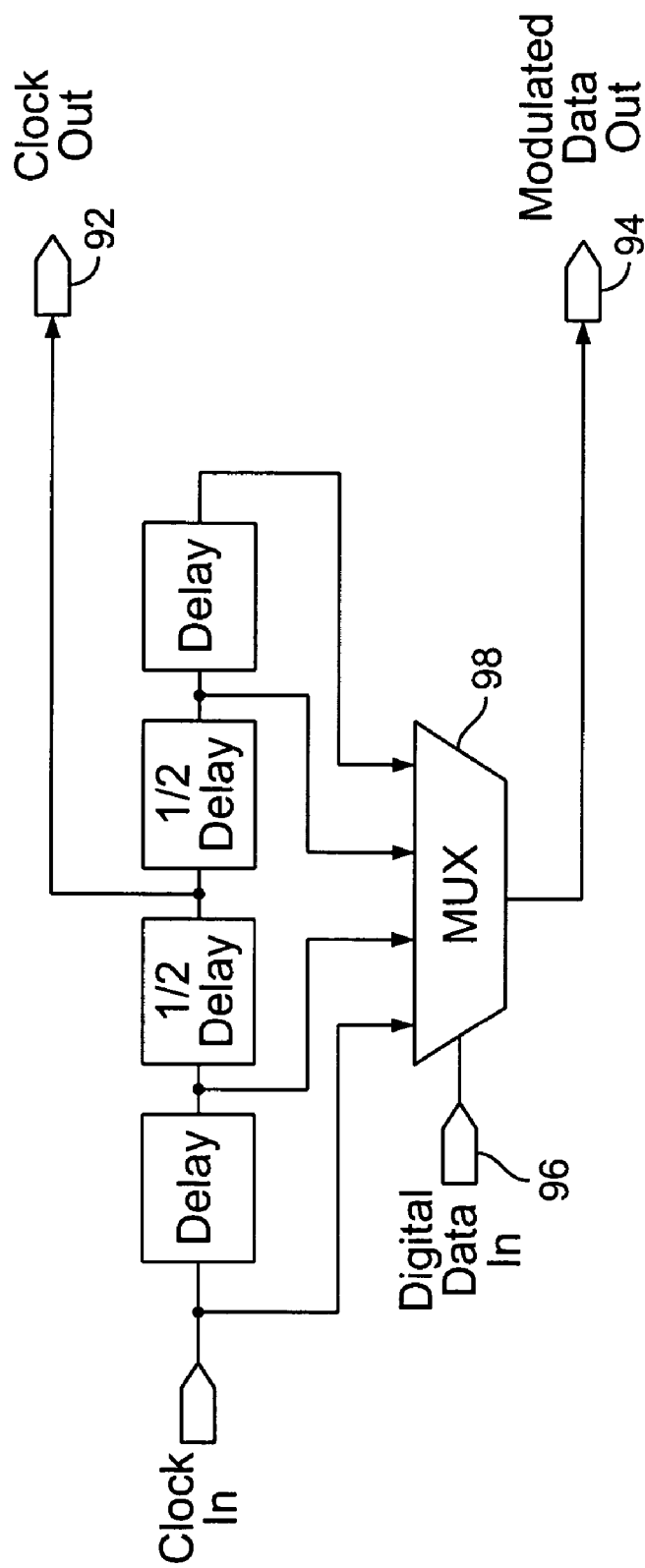
FIG. 7 is a block diagram of a single clock modulator.

A conceptual diagram of an implementation of the single-clock modulation scheme is shown in FIG. 7, where a unit delay is equal to 400 ps using the timing assumed in FIG. 6. The clock out 92 can be forwarded using circuit structures that are matched to the structures used for the modulated data out 94 to account for time delays due to conductor routing constraints (e.g., using de-skew circuitry) such that their relative delay is as shown in FIG. 7. The first and fourth transitions are separated from the clock reference by 1½ unit delays. The second and third transitions are separated from the clock reference by ½ unit delays. The digital data in 96 determines which of the inputs to the MUX 98 is selected to drive the modulated data out 94.

Figure 8:
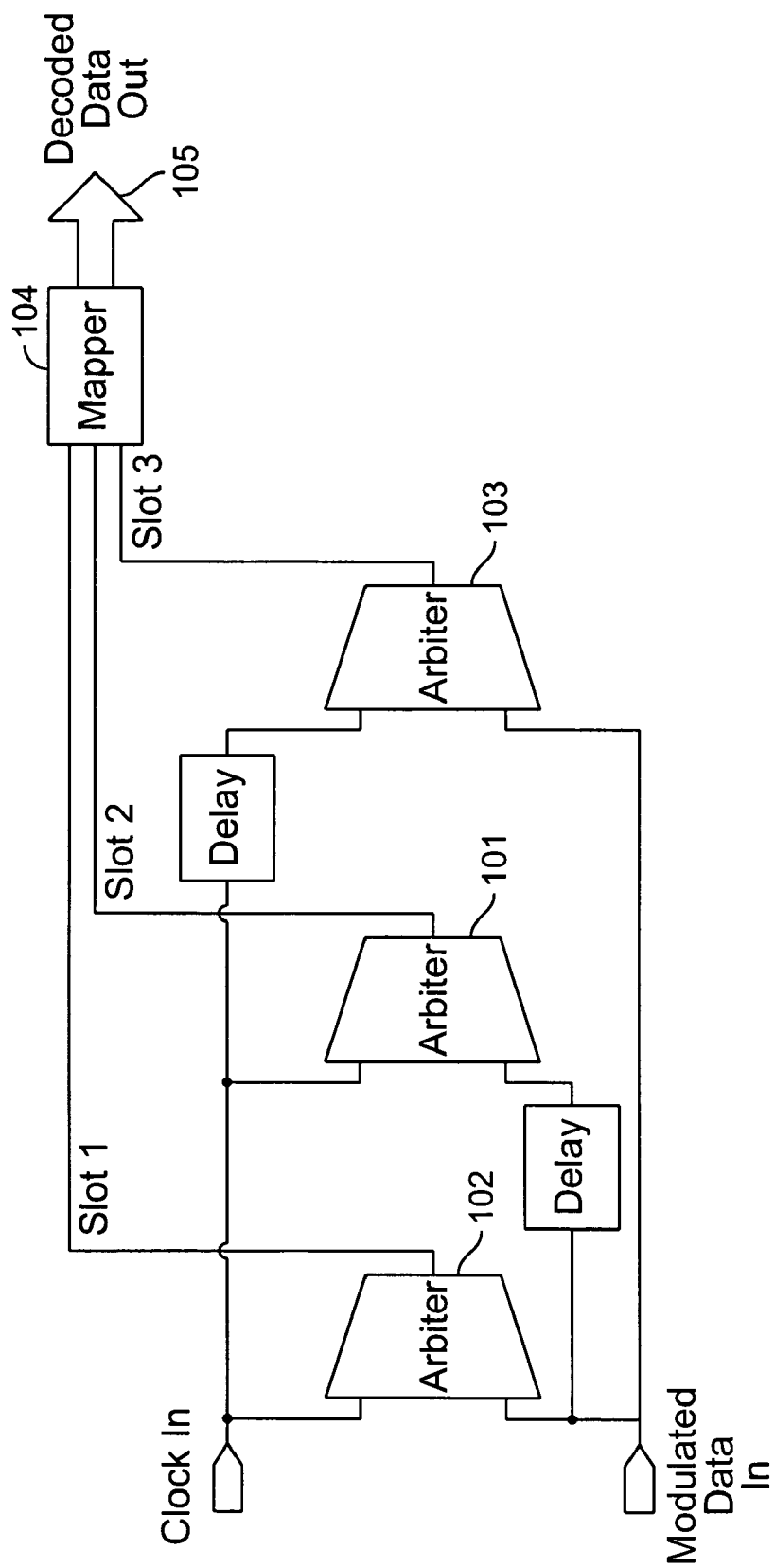
FIG. 8 is a block diagram of a single clock demodulator

The corresponding single-clock demodulator is shown in FIG. 8. An arbiter 101 determines which of transitions on its inputs occurs first. If arbiter 101 determines a data transition occured first then slot 1 is detected. Similarly, if arbiter 102 determines a data transition occurred first then slot 2 is detected, and if arbiter 103 determines a data transition occurred first then slot 3 is detected. At each arbiter, the demodulator circuit uses delays where necessary to place the clock transition in the center of two possible adjacent data transitions (the center of the received "eye"). Therefore, the demodulator imparts another unit interval of jitter integration, for a total jitter integration of 2½ unit intervals. If no data transition has been detected in slots 1-3, the arrival of a data transition in the fourth slot may be assumed for modulation schemes with guaranteed transitions as in the example shown in FIG. 7; therefore no arbiter is used to detect slot 4. The symbol mapper 104 then uses the outputs of the arbiters to generate the decoded data out 105.

Figure 9:
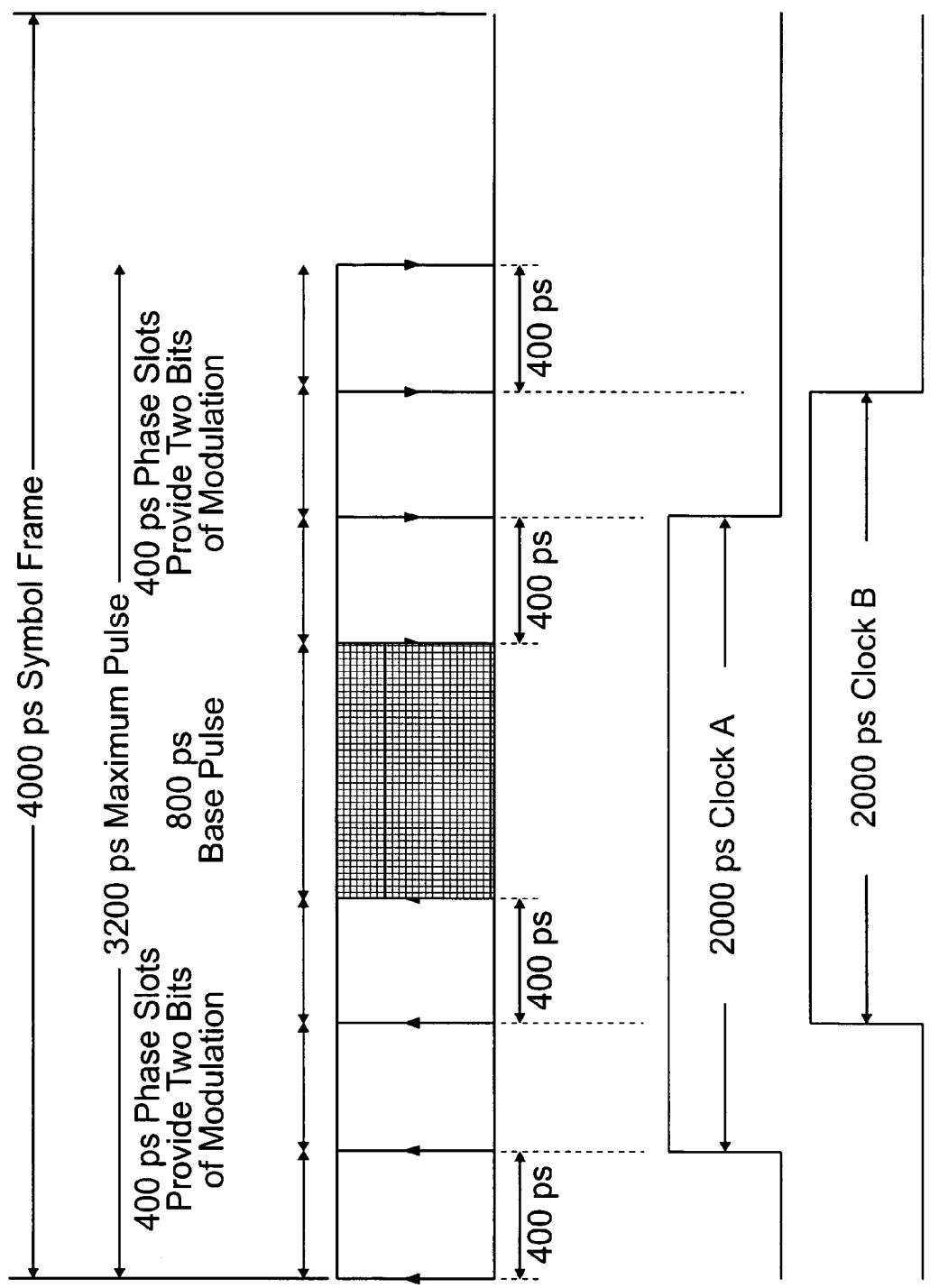
FIG. 9 shows a dual clock phase modulation scheme.
Figure 10:
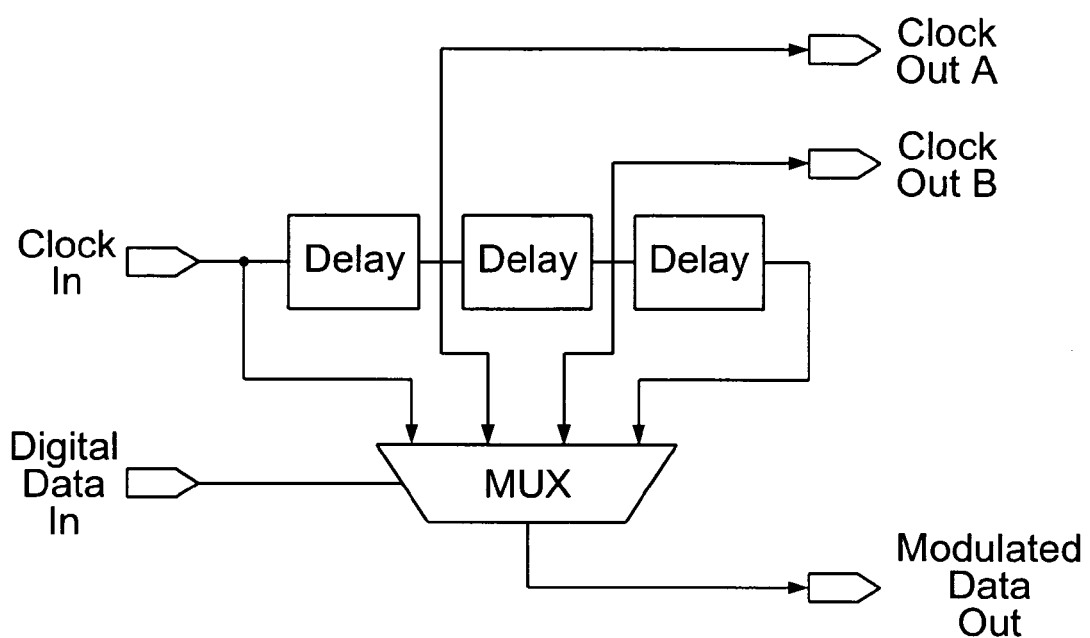
FIG. 10 is a block diagram of a dual clock modulator.
Figure 11:
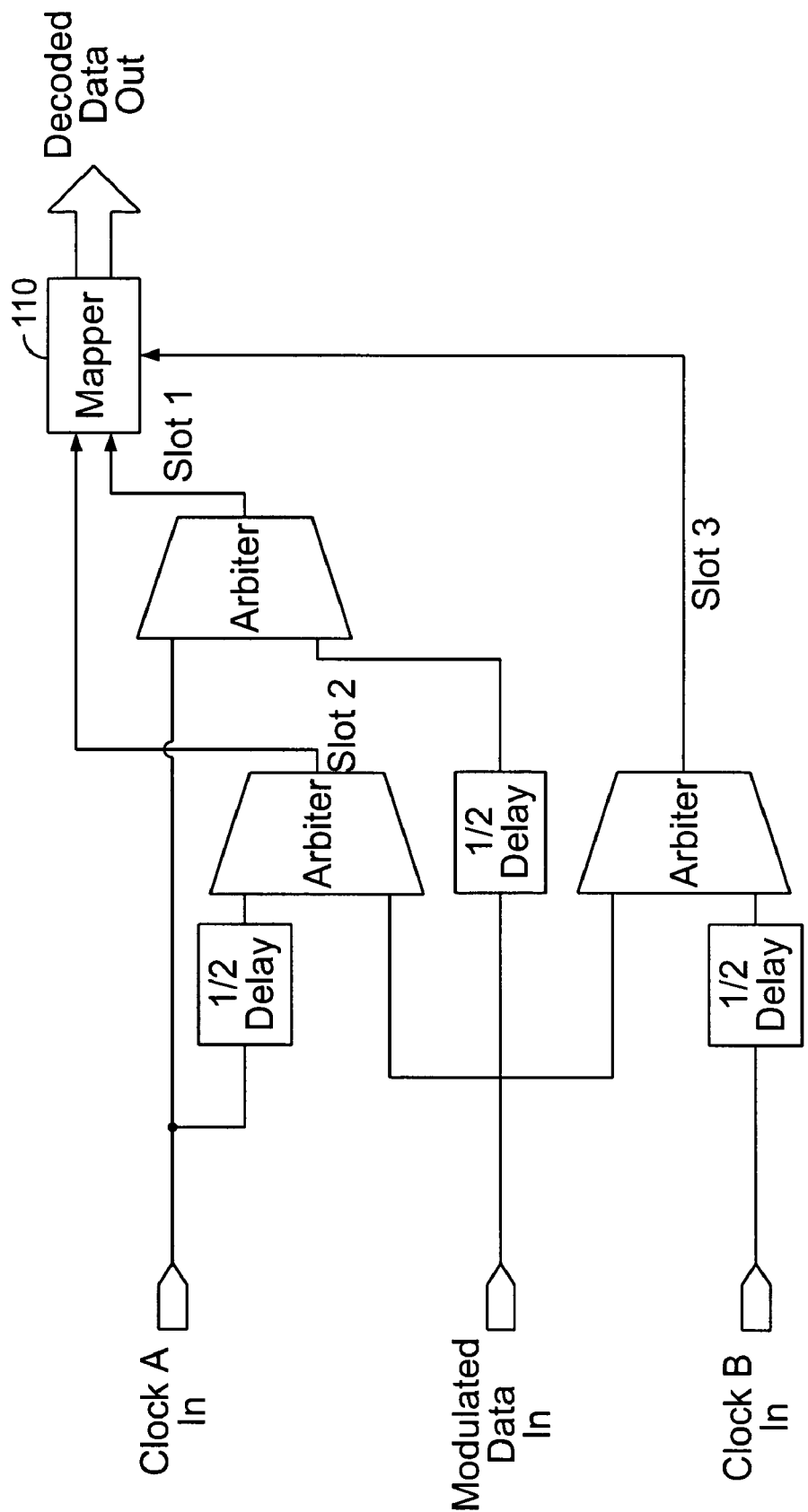
FIG. 11 is a block diagram of a dual clock demodulator.

The modulation scheme is shown above in FIG. 9 is identical to the one in FIG. 6, except for the clocking. Two clocks are used, which are aligned with slots 2 and 3. From FIG. 10 it can be seen that the jitter integration times are reduced to one unit interval at the modulator. An additional ½ unit interval of jitter integration is accrued at the demodulator, as shown in FIG. 11. This results in a total accumulated jitter integration time of 1½ unit intervals, 60% of the single clock case. Again, slot 4 is assumed by default in the symbol mapper 110.

Adding a second clock reference to the bus as shown reduces the jitter integration, but even greater gains can be obtained. Adding a third clock to the example shown would reduce the jitter integration time to ½ of a unit interval, 33% of the two clock case, and 20% of the single clock case.

Transmission of digital data using multiple phase-shifted clocks can also increase the performance of amplitude-modulated signals (e.g., 2-PAM which is simply binary amplitude-modulation) through its effect on EMI. Clocks, unlike data, have regular alternately high/low amplitude patterns corresponding to time-invariant emission spectra and are therefore worse contributors to EMI emission than are the corresponding data lines, whose emission spectra are typically more distributed. Multiple clocks operating at frequencies that are lower than that of a single, higher-speed clock can provide equivalent timing references for ampli-tude-modulated signals while reducing the emissions spectrum that causes EMI. Phase-modulated signals also benefit from reduced EMI of multiple phase-shifted lower frequency clocks, in addition to the increase in bandwidth from lower jitter integration as described above.

Considering an example using binary amplitude-modulation, replacing a single full-speed clock with two half-speed clocks with a relative phase shift of 90 degrees reduces EMI emissions without compromising the maximum data rate achievable at a given maximum BER. With a 90 degree relative phase shift between them, the two half-speed clocks jointly provide reference edges with the same spacing as the full-speed clock. No additional timing jitter is introduced if the modulator and demodulator circuits reference the nearest clock edges, and the forwarded clocks use matched structures (e.g., using de-skew circuitry). The emission spectra of these two different clock schemes are compared below using a Fourier series analysis.

Figure 12:
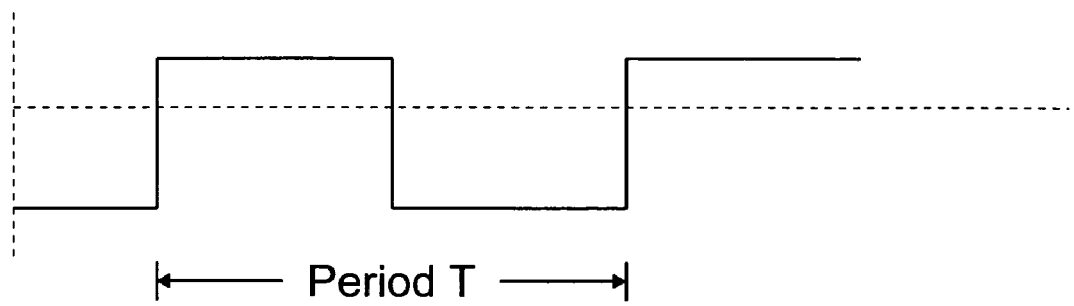
FIG. 12 is a plot of a square wave.

A periodic signal can be expressed as a sum of a number of sinusoidal frequency components using a Fourier series. The frequencies of the components are multiples of the fundamental frequency 1/T, where T is the period of the signal. The amplitude of each constituent component is determined by the shape of the waveform. A digital clock signal is often conveniently represented schematically as a square wave, as shown in FIG. 12. The Fourier series representation of a pure square wave having a period T is $$f(t) = \frac{4A}{\pi} \sum_{n=1,3,5...} \frac{1}{n} \sin(n\omega_0 t)$$

where A is the amplitude of the waveform, and $\omega_0$ is its fundamental frequency, which is related to the period by $$\omega_0 = \frac{2\pi}{T}.$$

Figure 13:
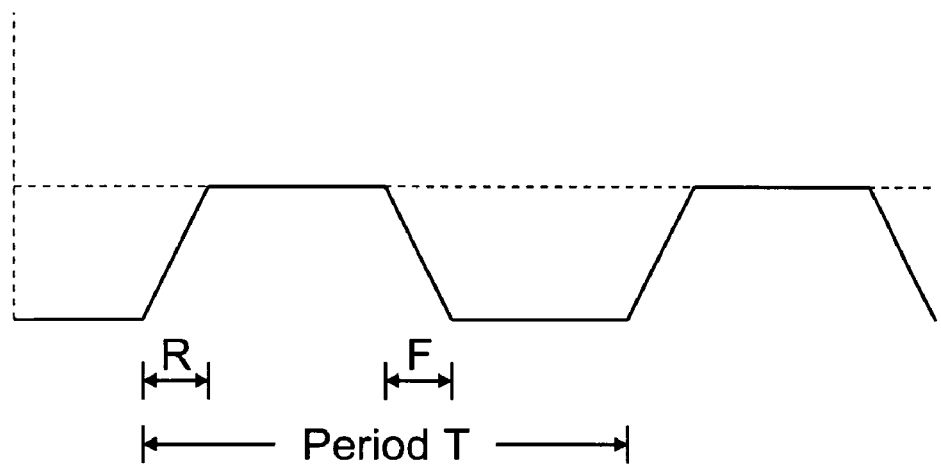
FIG. 13 is a plot of a piecewise linear waveform.

High-speed clock signals seldom behave like perfect square waves. Instead, they have finite rise-times, fall-times, and plateaus that are often each approximated as being linear, forming the piecewise linear waveform shown in FIG. 13, with period T, rise-time R, and fall-time F. If the rise and fall times are taken as being equal, the Fourier series takes the form:

$$f(t) = \frac{4A}{RTF \cdot \pi^2} \sum_{n=1,3,5,\ldots} \frac{\sin(n\pi \cdot RTF)}{n^2} \sin(n\omega_0 t)$$

where RTF is defined as being the fraction of the overall period consumed by the rise time, $$RTF = \frac{R}{T}.$$

Figure 14:
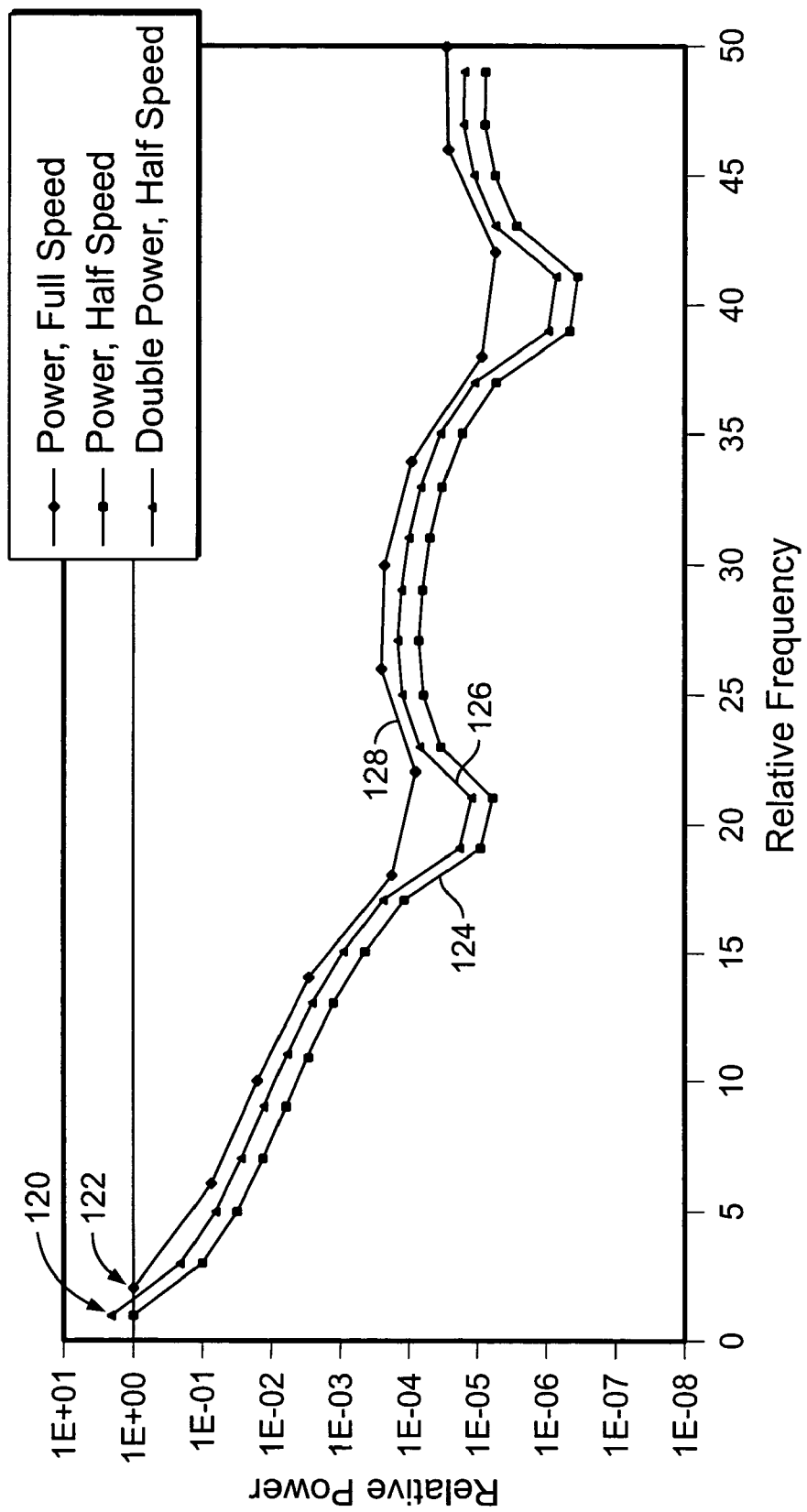
FIG. 14 shows plots of harmonic power spectra.

If we consider a digital data bus in which a single high-speed clock having an RTF of 10% is replaced by two clocks at half the frequency, with a relative 90 degree phase shift, having the same rise-time (and thus an RTF of 5%), the frequency spectrum of the multiple clocks will have a lower magnitude over most frequency components as shown in FIG. 14.

The plots in FIG. 14 show the relative magnitudes of the power spectra of one half-speed clock 124, two half-speed clocks 126, and one full-speed clock 128. While the half-speed pair have a fundamental frequency component with a combined power 120 that is twice that 122 of the single full-speed clock, for relative frequencies above the full-speed frequency, two half-speed clocks 126 have lower power, and therefore lower EMI emissions, than one full-speed clock 128.

Figure 15:
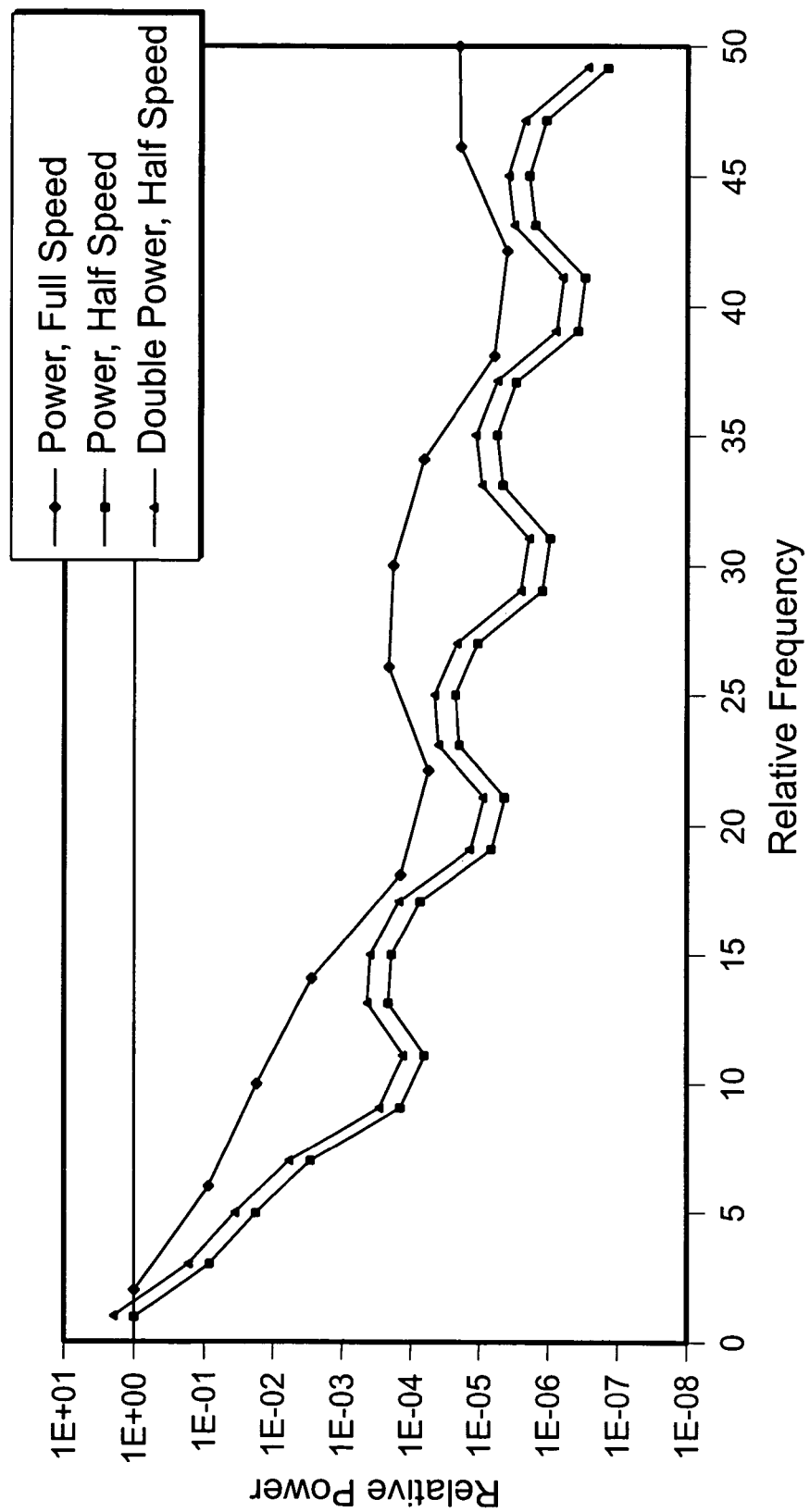
FIG. 15 shows plots of harmonic power spectra.

Longer rise-times may be chosen if a multiple clock scheme is chosen, which would reduce the magnitude of the harmonics even further. There is less flexibility in reducing rise-times for full-speed clocks. If both full-speed and half-speed rise-time fractions of 10% (RTF=0.1) are compared, the harmonic content of the half-speed clocks is reduced further as shown in FIG. 15. It should also be noted that if the second clock line displaces what would otherwise be a data line, the contribution to the total EMI would be reduced beyond what would be achieved by replacing one high-speed clock with two lower speed clocks.

Figure 16:
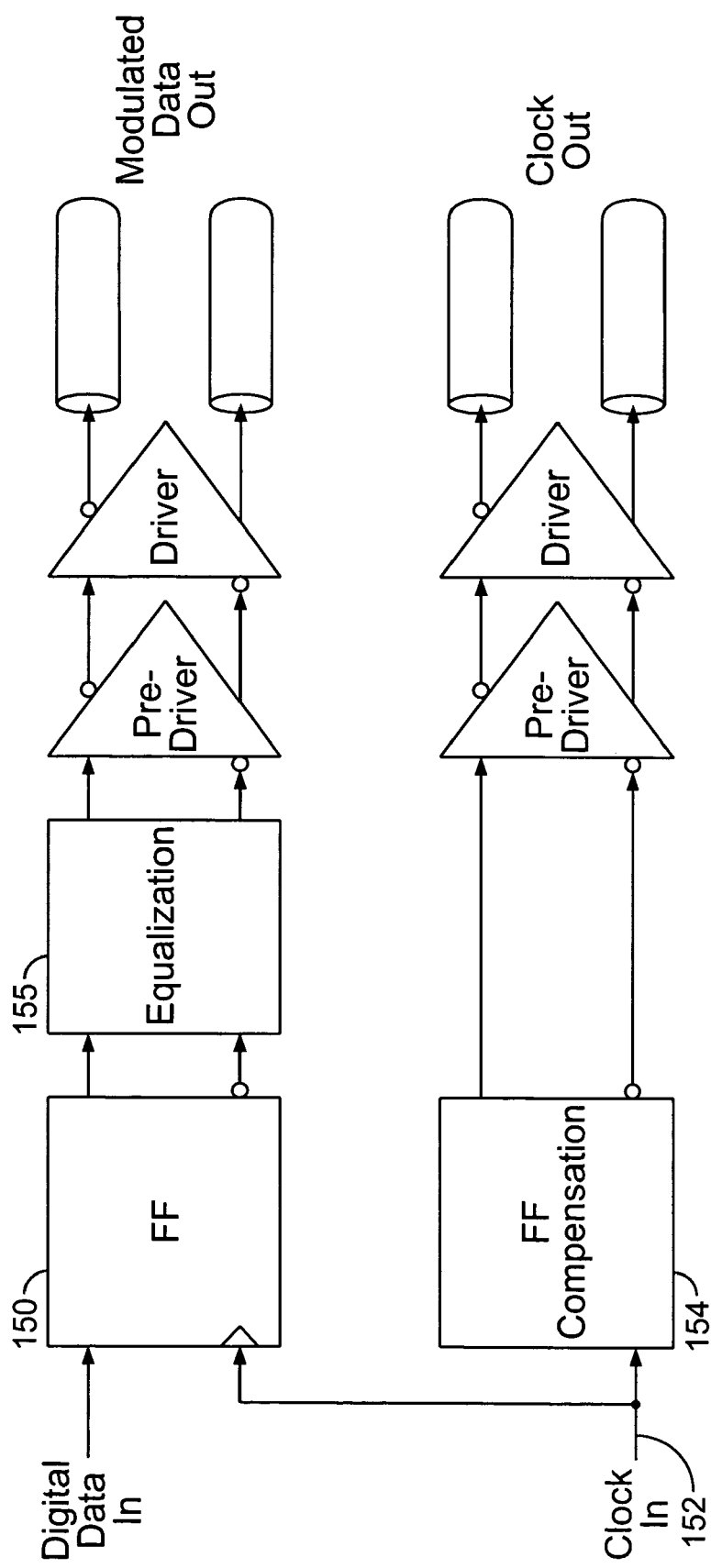
FIG. 16 is a block diagram of a single clock modulator.

FIG. 16 shows an exemplary transmitter modulator circuit for binary amplitude-modulation using one full-speed clock. A flip-flop (FF) 150, is used as a synchronization circuit to synchronize to the clock in 152. A corresponding FF compensation circuit 154, logically a buffer, is used to match the jitter integration of the forwarded clock path to the jitter integration of the data path. An equalization circuit 155 is used to compensate for gain variation over the spectrum of the modulated data signal that, if left uncompensated, could lead to distortion and a higher BER.

Figure 17:
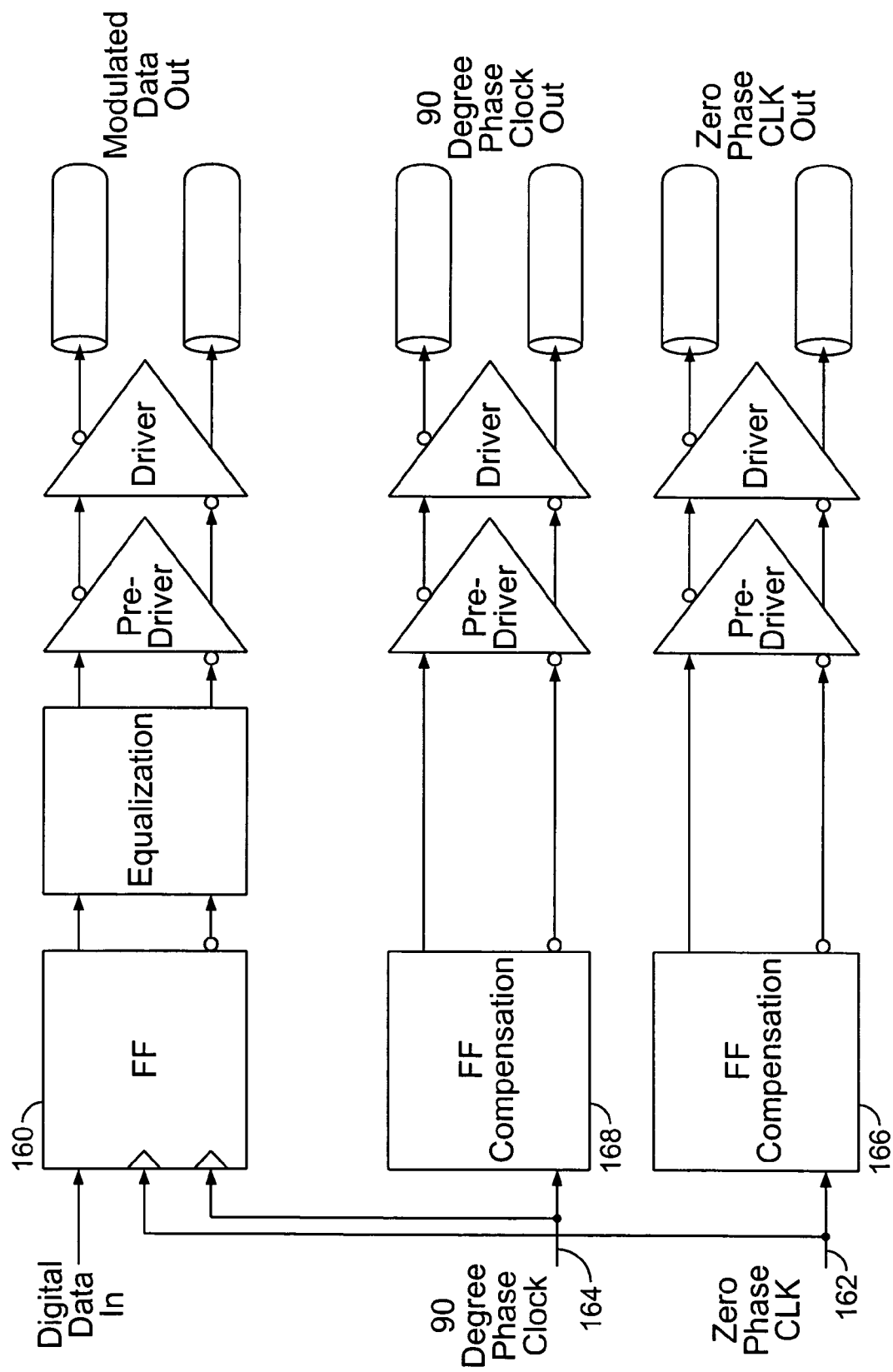
FIG. 17 is a block diagram of a dual clock modulator.

FIG. 17 shows an exemplary transmitter modulator circuit for binary amplitude-modulation modified to use two half-speed clocks shifted in phase by 90 degrees. A flip-flop 160, that clocks data in response to the edges of both the zero phase clock 162 and the 90 degree phase shifted clock 164, is used to synchronize the data to the two forwarded clocks. A first FF Compensation block 166 and a second FF Compensation block 168 are used to match the jitter integration of the clock paths to the jitter integration of the data path.

Figure 18:
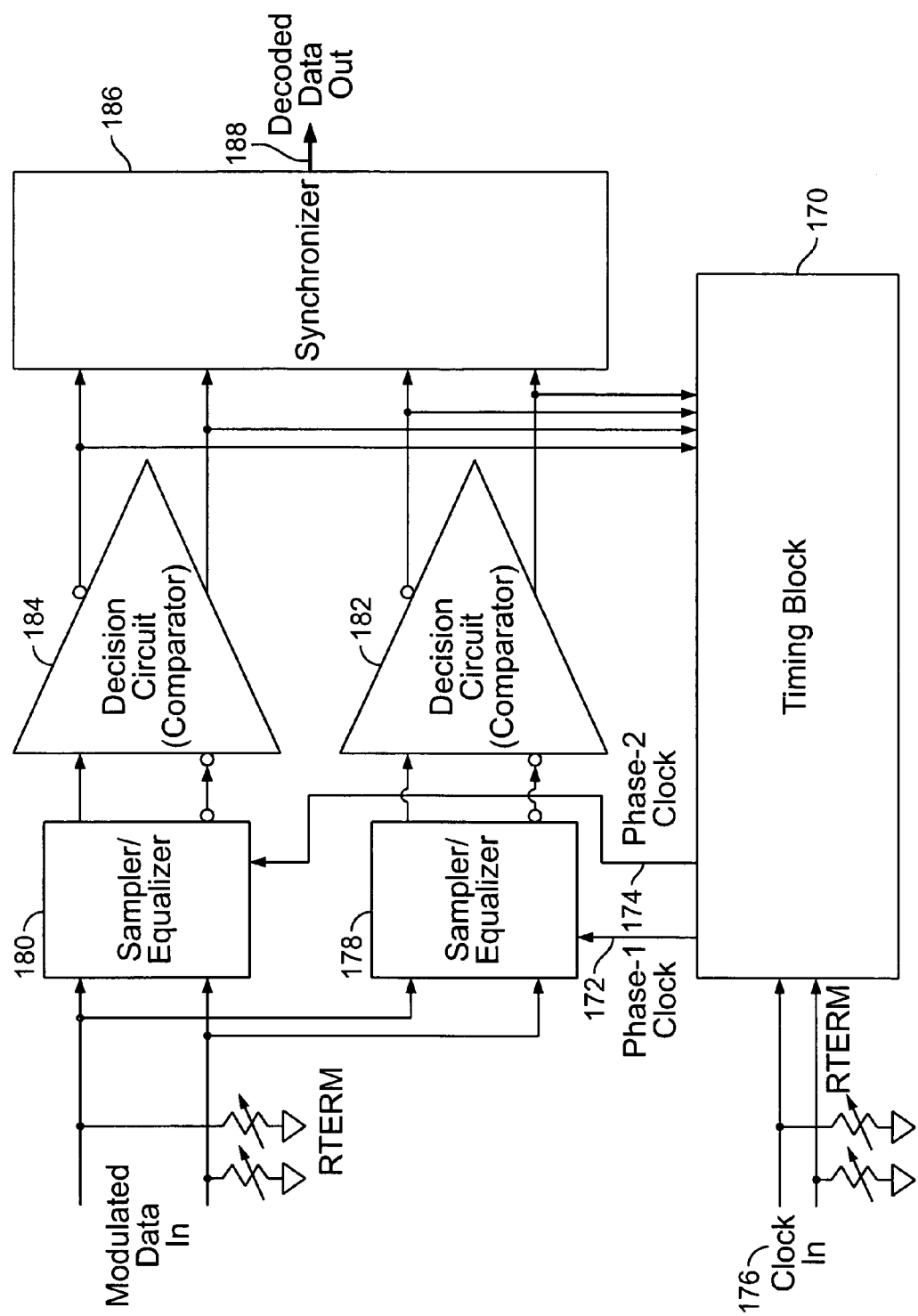
FIG. 18 is a block diagram of a single clock demodulator.

FIG. 18 shows an exemplary receiver demodulator circuit corresponding to the modulator circuit of FIG. 16, using the full-speed clock. The timing block 170 provides clock amplification and de-skew circuitry to align the clock to the data. This block 170 includes a delay locked loop (DLL), a phase interpolator, a level converter, and receiver control logic. A phase-1 clock 172 and a phase-2 clock 174 are half-speed clocks with a relative 90 phase shift generated from the clock in 176 by the timing block 170. Interleaved circuit components are then used do separately decode even and odd modulated data symbols. The phase-1 clock 172 is used by the sampler/equalizer 178 in order to decode even modulated data symbols, and the phase-2 clock 174 is used by the sampler/equalizer 180 in order to decode odd modulated data symbols. Even data from a first decision circuit 182 is interleaved with odd data from a second decision circuit 184 by a synchronizer 186 to produce decoded data out 188.

Figure 19:
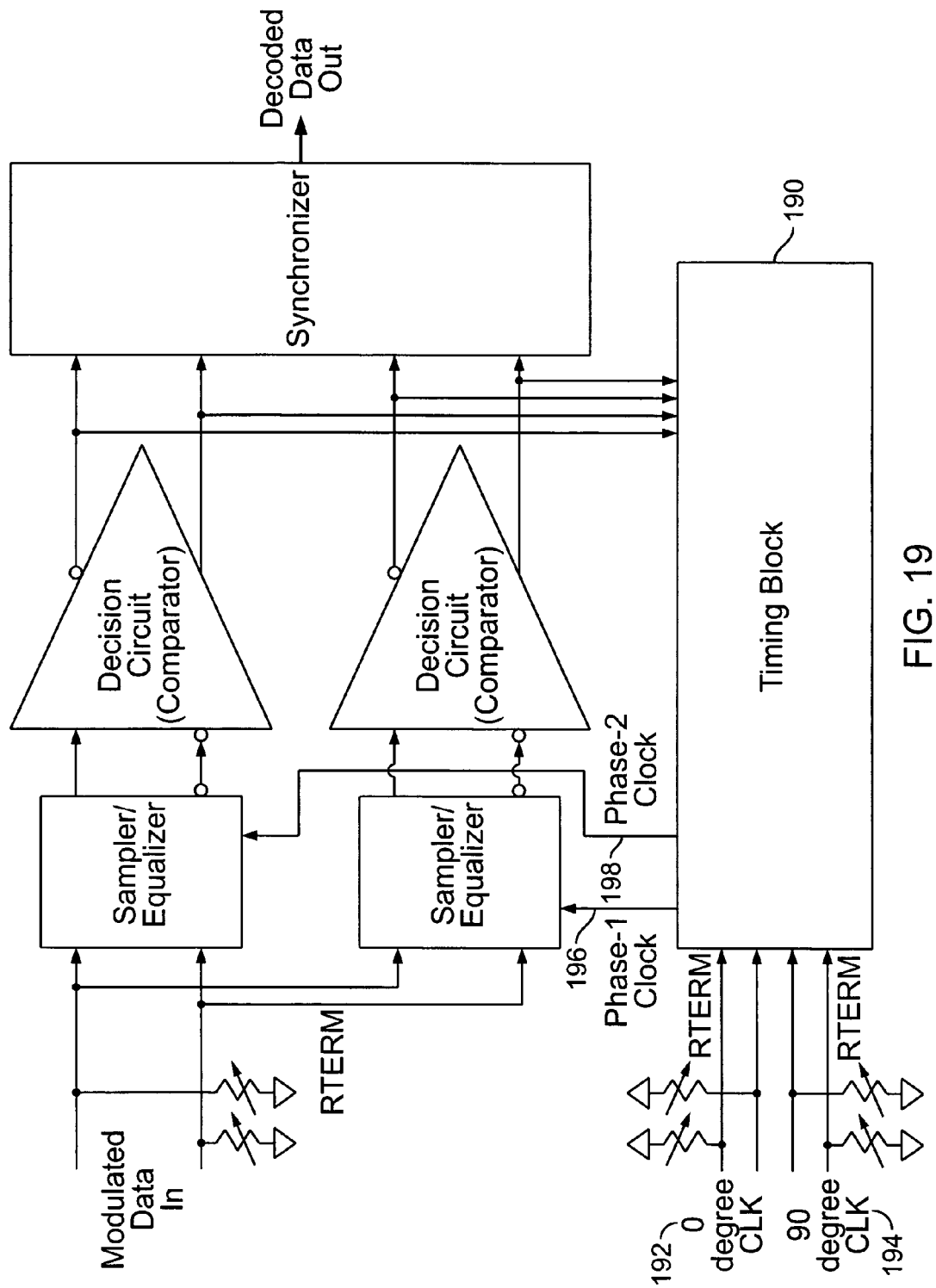
FIG. 19 is a block diagram of a dual clock demodulator

FIG. 19 shows an exemplary receiver demodulator circuit corresponding to the modulator circuit of FIG. 17, using two half-speed clocks. The operation of this demodulator circuit is similar to the operation of the circuit in FIG. 18. The timing block 190 also provides clock amplification and de-skew circuitry, and includes a phase interpolator, a level converter, and receiver control logic. However, in this two clock demodulator circuit, the timing block 190 generates the phase-1 clock 196 from the zero degree clock 192, and the phase-2 clock 198 from the 90 degree clock 194.

What is claimed is:

1. A method comprising
    receiving a clock signal;
    skewing a phase of the clock signal with a series of delay elements to generate a plurality of sequences of predetermined reference times that are skewed with respect to one another by a predetermined amount;
    establishing at least two of the plurality of sequences of predetermined reference times on respective ones of at least two communication lines, at least some of the reference times of at least one of the sequences occurring out-of-phase with at least some of the reference times of another of the sequences; and
    encoding digital data onto data signals on one or more communication lines such that a time difference between at least one of the data signals and the nearest one of the reference times on one of the communication lines is smaller than the time difference between the same data signal and the nearest one of the reference times on another one of the communication lines.

2. The method of claim 1 in which the reference times are rising or falling transitions of digital signals.

3. The method of claim 1 in which the data signals are at one of multiple potential time locations of rising or falling transitions of digital signals, where the multiple potential time locations comprise a data symbol.

4. The method of claim 3 wherein encoding comprises
    associating a particular digital data value with one of the multiple potential rising transitions of the data symbol, and
    associating a particular digital data value with one of the multiple potential falling transitions of the data symbol.

5. The method of claim 1 in which each of the data signals comprises one of multiple potential amplitude levels between pre-determined time locations of rising or falling transitions of digital signals.

6. The method of claim 5 wherein encoding comprises associating a particular digital data value with one of the multiple potential amplitude levels.

7. The method of claim 1 further comprising decoding the digital data based on the data signals and the sequences.

8. The method of claim 7 wherein decoding comprises delaying at least one of the sequences.

9. The method of claim 7 wherein decoding comprises delaying at least one of the data signals.

10. The method of claim 8 or claim 9 where decoding further comprises determining the order in time between one of the data signals and one of the reference times.

11. The method of claim 10 where decoding the digital data is based on the order in time.

12. An apparatus comprising
a source of at least two reference signals, each containing a sequence of predetermined reference times, at least some of the reference times of at least one of the sequences occurring out-of-phase with at least some of the reference times of another of the sequences, wherein the source is to receive a clock signal as an input and further wherein the source includes circuitry to skew a phase of the clock signal with a series of delay elements to generate the at least two reference signals; and
a modulator circuit having one or more outputs for data signals onto which digital data have been encoded such that a time difference between at least one of the data signals and the nearest one of the reference times on one of the reference signals is smaller than the time difference between the same data signal and the nearest one of the reference times on another one of the reference signals, and at least two outputs for the reference signals;
a demodulator circuit with at least one input for the data signals and at least two inputs for the reference signals; and
a data bus comprising communication lines which are connected to both the modulator circuit and the demodulator circuit, which can enable the transmission of the data signals and the reference signals between the modulator and demodulator circuits.

13. The apparatus of claim 12 in which the reference times are rising or falling transitions of digital signals.

14. The apparatus of claim 12 in which the data signals are at one of multiple potential time locations of rising or falling transitions of digital signals, where the multiple potential time locations comprise a data symbol.

15. The apparatus of claim 14 where the modulator is configured to encode digital data onto the data signals by
associating a particular digital data value with one of the multiple potential rising transitions of the data symbol, and
associating a particular digital data value with one of the multiple potential falling transitions of the data symbol.

16. The apparatus of claim 12 in which each of the data signals comprises one of multiple potential amplitude levels between pre-determined time locations of rising or falling transitions of digital signals.

17. The apparatus of claim 16 where the modulator is configured to encode digital data onto the data signals by associating a particular digital data value with one of the multiple potential amplitude levels.

18. The apparatus of claim 12 in which the demodulator circuit is configured to decode the digital data based on the data signals and the reference signals.

19. The apparatus of claim 18 in which the demodulator circuit is further configured to delay at least one of the reference signals.

20. The apparatus of claim 18 in which the demodulator circuit is further configured to delay at least one of the data signals.

21. The apparatus of claim 19 or 20 in which the demodulator circuit is further configured to determine the order in time between one of the data signals and one of the reference times.

22. The apparatus of claim 21 in which the demodulator circuit is further configured to decode the digital data based on the order in time.

23. A system comprising
at least two integrated circuits mounted on at least one circuit board;
a data bus;
at least one modulator circuit;
at least one demodulator circuit;
a source of at least two reference signals, each containing a sequence of predetermined reference times, at least some of the reference times of at least one of the sequences occurring out-of-phase with at least some of the reference times of another of the sequences, wherein the source is to receive a clock signal as an input and further wherein the source includes circuitry to skew a phase of the clock signal with a series of delay elements to generate the at least two reference signals; and;
the modulator circuit having one or more outputs for data signals onto which digital data have been encoded such that a time difference between at least one of the data signals and the nearest one of the reference times on one of the reference signals is smaller than the time difference between the same data signal and the nearest one of the reference times on another one of the reference signals, and at least two outputs for the reference signals;
the demodulator circuit with at least one input for the data signals and at least two inputs for the reference signals; and
the data bus comprising communication lines which are connected to both the modulator circuit and the demodulator circuit, which can enable the transmission of the data signals and the reference signals between the modulator and demodulator circuits.

24. The system of claim 23 in which the reference times are rising or falling transitions of digital signals.

25. The system of claim 23 in which the data signals are at one of multiple potential time locations of rising or falling transitions of digital signals, where the multiple potential time locations comprise a data symbol.

26. The system of claim 25 where the modulator is configured to encode digital data onto the data signals by
associating a particular digital data value with one of the multiple potential rising transitions of the data symbol, and
associating a particular digital data value with one of the multiple potential falling transitions of the data symbol.

27. The system of claim 23 in which each of the data signals comprises one of multiple potential amplitude levels between pre-determined time locations of rising or falling transitions of digital signals.

28. The system of claim 27 where the modulator is configured to encode digital data onto the data signals by associating a particular digital data value with one of the multiple potential amplitude levels.

29. The system of claim 23 in which the demodulator circuit is configured to decode the digital data based on the data signals and the reference signals.

30. The system of claim 29 in which the demodulator circuit is further configured to delay at least one of the reference signals.

31. The system of claim 29 in which the demodulator circuit is further configured to delay at least one of the data signals.

32. The system of claim 30 or 31 in which the demodulator circuit is further configured to determine the order in time between one of the data signals and one of the reference times.

33. The system of claim 32 in which the demodulator circuit is further configured to decode the digital data based on the order in time.

* * * * *